(12) United States Patent
Schmid et al.

(10) Patent No.: US 10,857,725 B2
(45) Date of Patent: Dec. 8, 2020

(54) DEVICE AND METHOD FOR COATING WORKPIECES

(71) Applicant: Homag Holzbearbeitungssysteme AG, Schopfloch (DE)

(72) Inventors: Johannes Schmid, Starzach/Wachendorf (DE); Achim Gauss, Dornstetten (DE); Joachim Fetscher, Schopfloch (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 0 days.

(21) Appl. No.: 16/374,333

(22) Filed: Apr. 3, 2019

(65) Prior Publication Data

US 2019/0224908 A1 Jul. 25, 2019

Related U.S. Application Data

(60) Division of application No. 15/390,956, filed on Dec. 27, 2016, now Pat. No. 10,307,956, which is a continuation of application No. 12/765,187, filed on Apr. 22, 2010, now abandoned.

(30) Foreign Application Priority Data

Apr. 22, 2009 (EP) ..................................... 09158457

(51) Int. Cl.
*B32B 41/00* (2006.01)
*B29C 63/00* (2006.01)
(Continued)

(52) U.S. Cl.
CPC .......... *B29C 63/0065* (2013.01); *B27D 5/003* (2013.01); *B29C 63/003* (2013.01);
(Continued)

(58) Field of Classification Search
CPC ......... H04L 45/26; H04L 45/32; H04L 45/02; H04L 49/1515; B29C 63/0065;
(Continued)

(56) References Cited

U.S. PATENT DOCUMENTS 4,155,798 A * 5/1979 Becker ................. B23K 11/163
156/216
4,226,661 A * 10/1980 Off ....................... A41D 27/204
156/358
(Continued)

*Primary Examiner* — Michael N Orlando
*Assistant Examiner* — Joshel Rivera
(74) *Attorney, Agent, or Firm* — Scott R. Cox

(57) ABSTRACT

A device for coating of workpieces, which preferably includes, at least in sections, wood, wooden materials, plastics, aluminium or the like. The device includes a feed device for feeding a coating material, a pressing device for pressing the coating material onto a surface of the workpiece, a conveyor device for causing a relative motion between the pressing device and the respective workpiece, and a first joining device for applying and/or activating an adhesive agent on a coating material fed by the feed device and/or a surface to be coated of the workpiece. The device further includes at least a second joining device for applying and/or activating an adhesive agent on a coating material fed by the feed device and/or a surface to be coated of the workpiece.

10 Claims, 3 Drawing Sheets

Figure 1:
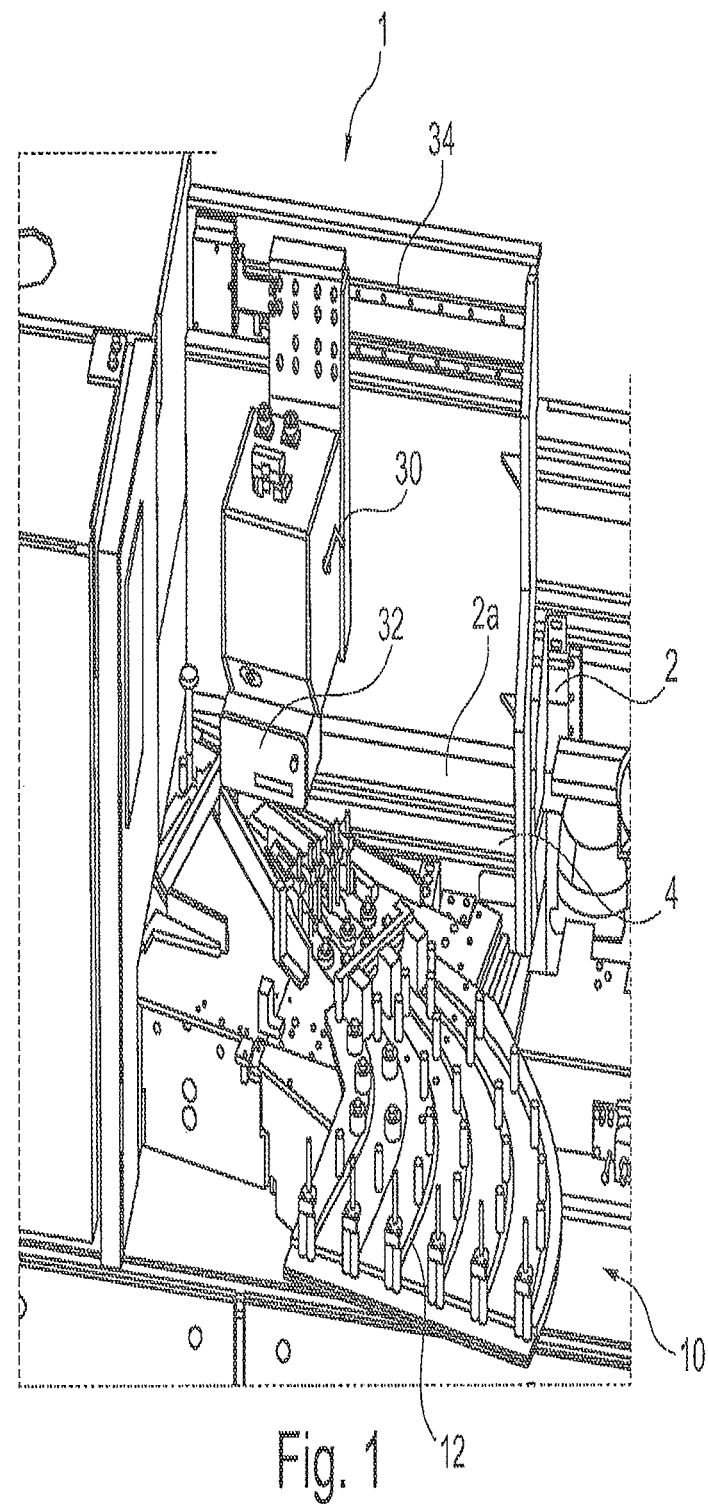

(51) Int. Cl.
*B27D 5/00* (2006.01)
*B29C 63/02* (2006.01)
B29C 63/48 (2006.01)
B29K 305/02 (2006.01)
B29K 311/14 (2006.01)

(52) U.S. Cl.
CPC .......... *B29C 63/0004* (2013.01); *B29C 63/02* (2013.01); *B29C 2063/485* (2013.01); *B29K 2305/02* (2013.01); *B29K 2311/14* (2013.01); *Y10T 156/10* (2015.01)

(58) Field of Classification Search
CPC ... B29C 63/0004; B29C 63/003; B29C 63/02; B29C 2063/485; B27D 5/003; Y10T 156/10; B29K 2305/02; B29K 2311/14
USPC ............... 156/60, 64, 350, 351, 378, 379
See application file for complete search history.

(56) References Cited

U.S. PATENT DOCUMENTS

| | | | |
|---|---|---|---|
| 5,954,918 A * | 9/1999 | Belivakici .......... | B65H 35/0013 156/468 |
| 2004/0091694 A1 * | 5/2004 | Holzer ................ | B29C 35/0272 428/323 |
| 2009/0139649 A1 * | 6/2009 | Albrecht ................ | B41M 1/30 156/277 |

* cited by examiner

DEVICE AND METHOD FOR COATING WORKPIECES

CROSS-REFERENCE TO RELATED APPLICATIONS

This application is a divisional application based on U.S. application Ser. No. 15/390,956, filed Dec. 27, 2016, which is a continuation application based on U.S. application Ser. No. 14/765,187, filed Apr. 22, 2010, now abandoned, which was filed claiming priority to European patent application no. 09 158 457.3, filed Apr. 22, 2009, the disclosures of which are herein incorporated by reference in their entirety.

FIELD

The invention concerns a device for the coating of workpieces which preferably consist at least in sections of wood, wooden materials, plastics, aluminium or the like, according to the preamble of claim 1.

BACKGROUND

In the field of the furniture and building component industries, for example, workpieces are often provided at their surface with a coating material, such as an edge banding. Applying the coating material to the workpieces is usually performed by means of a suitable hot-melt adhesive which is applied in the molten state onto the edge or onto the workpiece, for example. Alternatively, it is also possible to heat an edge precoated with a hot-melt adhesive by means of a hot air blower and thus bring the hot-melt adhesive to the desired melting temperature (hot-dip temperature).

Moreover, DE 10 2006 056 010 discloses a coating method in which an adhesive agent provided on the coating material or on the workpiece is heated or activated by using a laser. This method proved to be very efficient since the adhesive agent can be heated or activated in a very targeted manner. However, it turned out that laser technology does not allow for optimum coating results in all types of workpieces and coating materials.

SUMMARY

Thus, it is an object of the present invention to provide a device of the aforementioned type, which allows for a high variability and adaptability to changing coating requirements in order to achieve optimum coating results with a large variety of coating materials and workpieces. Further, it is an object of the invention to provide a corresponding coating method. According to the invention, this object is achieved by means of a device for the coating of workpieces according to claim 1 as well as a method for the coating of workpieces according to claim 12. Particularly preferred embodiments of the invention are defined in the dependent claims.

The invention is based upon the notion of combining the advantages of various joining methods in one device and one method, respectively. To that end, the invention provides that in a generic coating device there is provided at least a second joining means for applying and/or activating an adhesive agent on a coating material conveyed by a feeding means and/or on a surface to be coated of the workpiece.

In this way, the range of application of the coating device according to the invention may be drastically increased since virtually any coating material, adhesive agent and workpieces may now be processed. Moreover, the coating device of the invention allows for a significantly increased operational reliability since during regular maintenance of a joining means the device as a whole may continue operation by means of the at least one further joining means. Equally, possible failure or damage to a joining means may be compensated by the (at least one) other joining means. This significantly increases the reliability of the coating device of the invention.

Although with certain workpieces the first and second joining means may cooperate within the framework of the invention, too, a further embodiment of the invention envisions that the first and the at least one second joining means are configured to alternately apply and/or activate the adhesive agent. In this way, the above-mentioned advantages of enhanced ease of maintenance and operational reliability may be achieved in a particularly pronounced manner, and a particularly failure-free operation is made possible.

The multiple joining means of the coating device according to the invention may in principle perform their joining operation in fixed positions, which are situated next to the surface to be coated of the workpiece or the feeding means for feeding the coating materials, for example. Thus, a particularly rapid operation of the coating device of the invention without or with minimal changing times is achieved, which is also very well suited for versatile manufacturing right down to single piece manufacture.

According to an embodiment of the invention, it is further envisioned that at least one joining means is movable between a joining position and a rest (standby) position. On the one hand, the joining means may hereby achieve an optimum joining result in the joining position, in which an optimum distance and an optimum relative position with respect to the workpiece to be coated and the coating material is adopted, for example. On the other hand, the rest position allows for less interference with other joining means as well as possibly for a good accessibility of the respective joining means in the rest position, for example for repair or maintenance purposes.

According to the invention, moving the joining means between a joining position and a rest position may be performed manually, too, for example by shifting the respective joining means along a suitable guide or possibly removing it completely by hand from the joining position and putting it into the rest position. According to a further embodiment of the invention it is envisioned, however, that the device according to the invention comprises at least one drive so as to move at least one joining means between a joining position and a rest position. Therefore, not only a completely automated operation of the device according to the invention is made possible, but precise positioning of the corresponding joining means in the joining and rest position, respectively, may be ensured, too.

Moreover, according to a further embodiment of the invention, it is envisioned that at least one joining means is releasably insertable into a support in a joining position of the device, in particular by means of a quick-action coupling. In this manner, the result is a particularly precise positioning of the joining means in the respective joining position, and a secure hold of the joining means. Moreover, employing a quick-action coupling allows to configure the movable joining means largely free of connecting cables, hoses and the like and to supply it through the quick-action coupling only in the joining position, for example with data, energy, adhesive agent or the like. Thus, both a manual and an automatic movement of the respective joining means is markedly simplified and, at the same time, is made more reliable and less failure-prone.

Within the framework of the present invention, the overall structure of the coating device may be designed in various ways. In view of rapid operation and high throughput of the coating device, it has turned out to be advantageous to configure the coating device as continuous machine in which the conveying means is formed by a continuous conveying means such as a belt-conveyor, a roller table or the like. Alternatively, it may also be a so-called stationary machine in which during the coating operation each workpiece is arranged largely stationary. Equally, hybrid forms of both concepts are advantageously possible within the framework of the invention.

According to a further embodiment of the invention, it is envisioned that at least one joining means is arranged at a preferably bar-shaped guide means which is, preferably, displaceable perpendicularly to its direction of extension. The guide means may, for example, be a portal or a cantilever (cross-arm) which may extend above a workpiece supporting arrangement, for example. Thus, the coating device according to the invention is enabled to perform, in addition to the coating, also further processing operations such as machining. In this way, a further enhancement of the field of applications of the coating device according to the invention may be achieved with little effort.

It is particularly preferred that the at least one joining means is displaceable along the guide means. In this manner, several surfaces of a workpiece may be coated rapidly and without errors in one process step (cycle), and a high overall working bandwidth of the device of the invention results.

According to an embodiment of the invention, it is further envisioned that it comprises at least one mandrel unit having a collet for preferably automatically exchanging processing tools and/or processing aggregates. Thus, the device according to the invention, may be employed for a whole range of processing tasks, so that in most cases even the entire refining operation of a workpiece may be performed in a single machine. The high variability and application bandwidth of the device of the invention is maintained in the process.

It is particularly preferred that at least one joining means is exchangeable into the collet of a mandrel unit. In this way, the at least one joining means may be removed from the mandrel unit and brought "to safety" while, for example, performing machining operations, in order to substitute (insert) it again rapidly, for example after finishing the machining operations, and to be ready for the sequence coating operation. Here, it is particularly preferred that the collet of the mandrel unit is configured as positive taper lock adapter (collet) and the joining means has a corresponding positive taper lock portion for engaging the positive taper lock adapter. Such an interface unites a capability for simple and rapid exchange with a secure connection between the joining means and the mandrel unit.

Alternatively or additionally, at least one joining means may also be provided independently of a collet of a mandrel unit within the device. In these cases, too, it is preferred, however, that at least one joining means is associated with a mandrel unit in order to be displaceable together. Thus, a simple construction of the device according to the invention ensues without the need to substitute and replace the joining means associated with the mandrel unit when needed.

According to an embodiment of the invention it is further envisioned that at least one joining means is associated with a respective pressing means for pressing the coating material onto a surface of the workpiece, preferably also with a feeding means for feeding a coating material. Thereby, an always precise and reliable association of the joining means and the pressing means, and preferably the feeding means, too, results so that an adhesive agent present on a coating material or to be applied thereon can be reliably activated or applied.

Within the framework of the present invention, the joining means may be configured in a wide variety of ways, wherein at least one joining means is, for example, formed also by classical hot-melt adhesive bonding (gluing) technology. Moreover, according to an embodiment of the invention it is envisioned that at least one joining means has an energy source. Within the framework of the present invention, the term "energy" is to be understood in a broad sense. Thus, according to an embodiment of the invention, it is envisioned that the at least one energy source is chosen from the group consisting of laser, infrared source, ultrasound source, magnetic field source, microwave source, plasma source, and gassing source. This non-exhaustive enumeration makes it clear that apart from classical energy sources also energy sources may be considered which apply energy to the coating material by means of a chemical reaction, for example, such as a gassing source. In this context, it is to be observed that the respective energy source may, on the one hand, activate an already present adhesive agent and, on the other hand, may convert an agent which as such does not act as adhesive agent, into an adhesive agent by application of energy, chemical reaction or the like.

Each of the mentioned energy sources has its own specific advantages. A laser, for example, allows for a particularly targeted and rapid processing, while infrared and plasma sources allow for a broad gorge operation and a good penetration (depth effect). Energy sources comprising ultrasound, magnetic fields and microwaves operate without contact and may input energy into the process even during the pressing on of the coating material. A magnetic field, in particular, exhibits a good penetration (depth effect). An energy source based upon gassing is particularly suitable to form, by application to and reaction with the coating material, a substance having adhesive properties, in the first place.

Moreover, the invention concerns a method for the coating of workpieces by using a device according to the invention with the steps according to claim 13. The inventive method is characterized in that, initially, a first joining means is used to activate and/or to apply an adhesive agent onto a coating material fed in the feeding means and/or a surface to be coated of a workpiece. Subsequently, a second joining means is used to activate and/or apply, in the coating of a further workpiece, an adhesive agent onto a coating material fed by the feeding means and/or a surface to be coated of a further workpiece. Thus, the advantages described above in reference to the inventive device may be achieved in a particularly pronounced manner. Here, it is particularly preferred that the first joining means is moved, in particular displaced (driven) from a joining position into a rest position also applying and/or activating an adhesive agent. It is after particularly preferred that the second joining means is brought, in particular displaced (driven) or manually inserted, into a joining position before applying and/or activating an adhesive agent.

DRAWINGS

Figure 2:
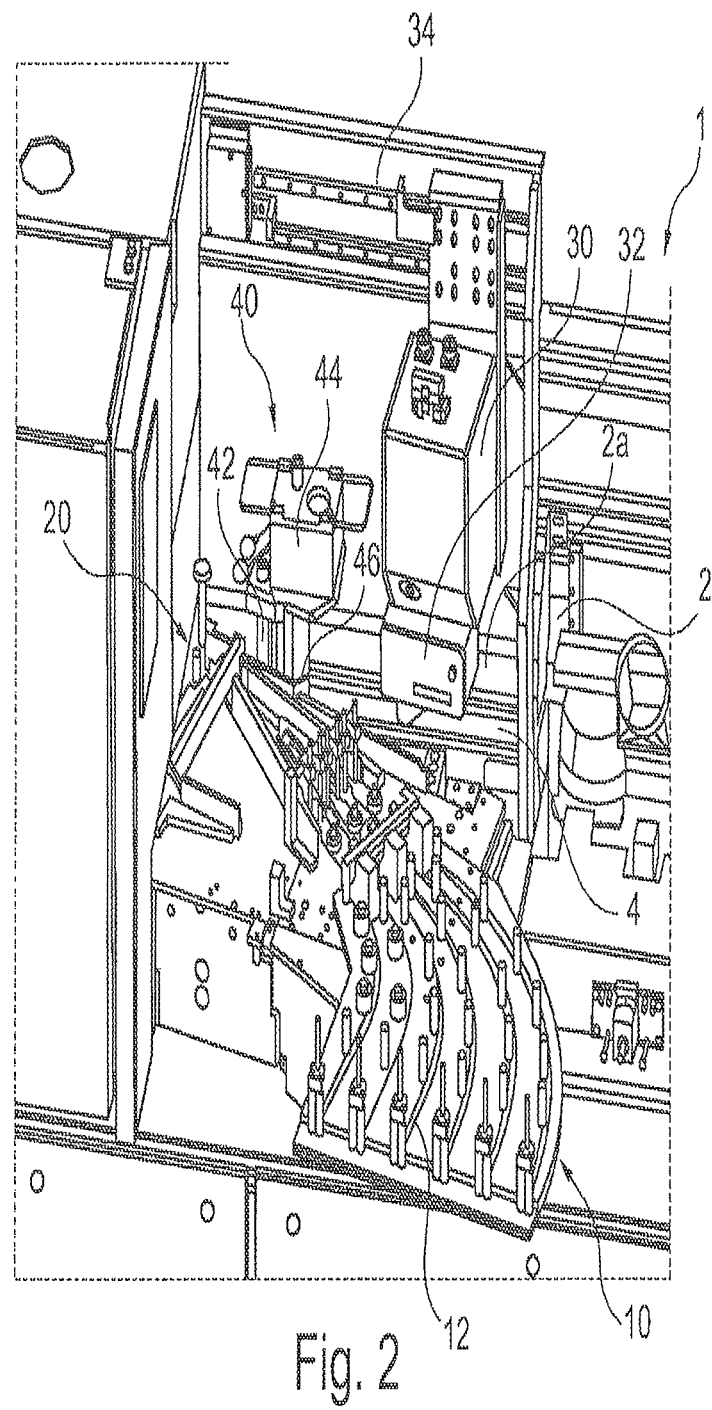
Figure 3:
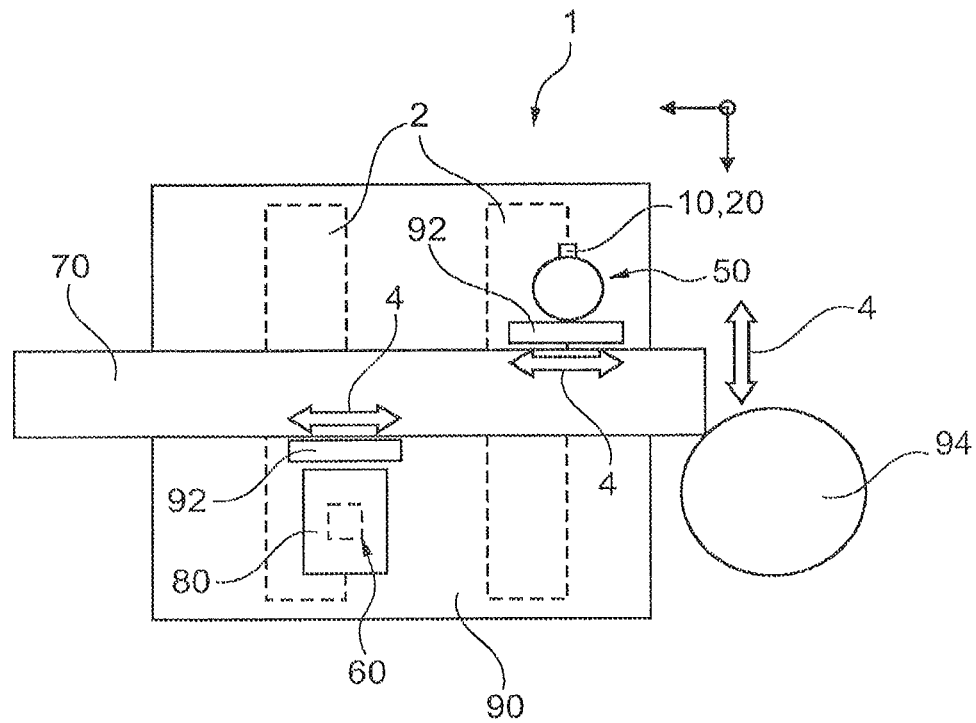
Figure 4:
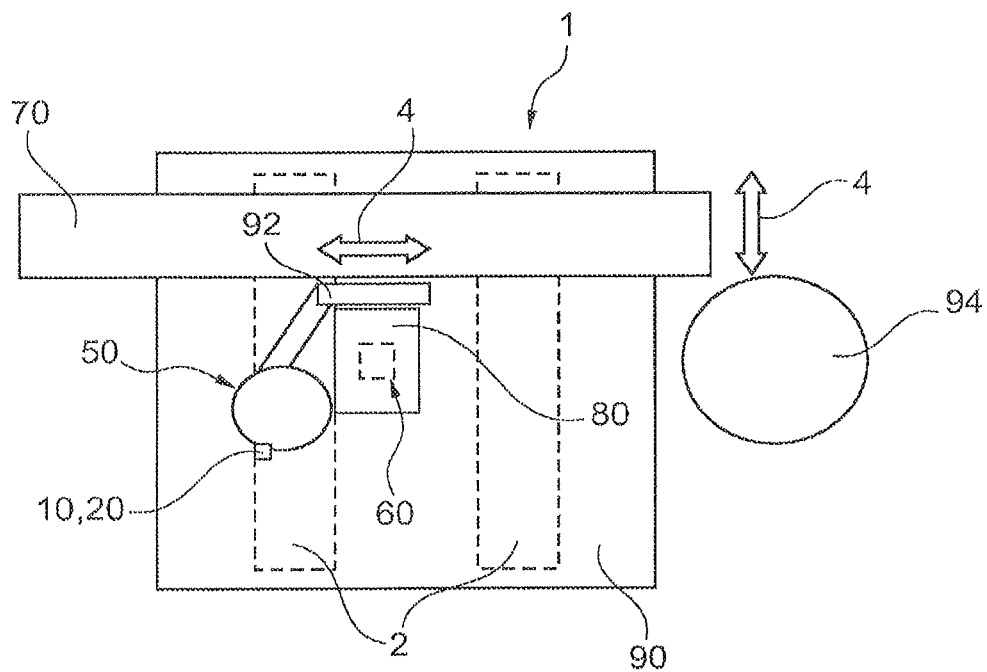

FIG. 1 schematically shows a partial perspective view of a coating device 1 as preferred embodiment of the present invention;

FIG. 2 schematically shows a further perspective view of the coating device shown in FIG. 1;

FIG. 3 schematically shows a top view of a work center (processing center) as second preferred embodiment of the present invention; and FIG. 4 schematically shows a top view of a further processing center as third preferred embodiment of the present invention.

DETAILED DESCRIPTION

Preferred Embodiments of the Present Invention are subsequently described in detail by referring to the enclosed drawings.

A coating device 1 for the coating of workpieces is schematically illustrated in FIG. 1 in a perspective view, as preferred embodiment of the present invention. In the present embodiment, the coating device 1 serves for coating of plate-shaped workpieces 2 which consist, at least in sections, of wood, wooden materials, plastic or the like, such as those used in the furniture and construction components industry. These may be a wide variety of workpieces such as solid wood or particle boards, lightweight construction boards, sandwich boards, skirting boards, profiles for profile wrapping etc. It is, however, to be observed that the present invention is not limited to such workpieces.

The coating device 1 comprises firstly a conveyor means 4, which in the present embodiment is configured as continuous conveyor means, for instance in form of a roller conveyor, belt conveyor or the like. The conveyor means 4 serves to convey the workpieces 2 in a direction of travel (in FIG. 1, from right to left).

Next to the conveyor means 4 a feeding means 10 for feeding a coating material 12 is arranged, which in the present embodiment may feed several different coating materials. The coating material may, for example, be an edge-banding material for a narrow face of the workpiece, but also a cover material for a broad face or any other arbitrary surface of the workpiece 2. The feeding means 10 comprises a reservoir of coating material 2 which may consist of a wide variety of materials such as plastics, veneer, paper, cardboard, metal, etc. and various combinations thereof. The coating material may be provided in form of rows (possibly within a cartridge), for example, but also in form of single sections.

In the present embodiment according to FIG. 1, at least one coating material comprises an integral or discrete layer which may acquire adhesive properties when supplied with energy. Such an integral coating material may, for example, be formed by a plastic material having a layer which exhibits adhesive properties through the supply of energy. In providing a discrete layer, the remaining coating material may, in principle, be made of an arbitrary material. In any case, the discrete layer is arranged at the side of the coating material facing the workpiece.

The feeding means 10 feeds the coating material 12 to a pressing means 20 for pressing the coating material 12 onto a surface 2a of the workpiece 2. The pressing means 20 is, in the present embodiment, a pressing roller (instead of a pressing roller, bands, shoes or the like may be used, for example), which rolls upon the surface 2a of the workpiece 2 and in this way presses the coating material 12 onto the surface 2a of the workpiece 2.

Further, the coating device 1 comprises a first joining means in the form of an energy source 30 for applying energy onto the adhesive agent, or onto the agent that can be made adhesive, of the coating material 12. Within the framework of the present invention, a wide variety of energy sources may be considered, such as laser, infrared source, ultrasound source, magnetic field source, microwave source, plasma source, gassing source, etc. All these energy sources 30 provide energy in a directional form and direct it onto the adhesive agent or the agent that can be made adhesive, which is fed as integral or discrete part of the coating material 12. The energy provided by the energy source goes through a focussing means 32 provided to direct the energy provided by the energy source 30 onto chosen regions of the adhesive agent to be activated or to be created.

In the simplest case, the focussing device 32 may be a lens. However, it is to be observed that in function of the energy source 30 different focussing devices 32 may be used, wherein the focussing device may be configured to adjust the scattering width and possibly the intensity of the applied energy, too. In this manner, the focussing means 32 directs the energy provided by the energy source 30 in the region immediately upstream of a pressing-on region in which the coating material 12 is pressed onto the surface 2a of the workpiece 2.

This operation of the energy source 30 and of the focussing device 32, too, is controlled by a controller not shown in detail, wherein the controller adapts in particular the power of the energy source 30 to the properties and dimensions of the adhesive agent or the agent that can be made adhesive as well as to the relative speed between the energy source and the adhesive agent or the coating material 12. Additionally, the controller may also elaborate information from sensors monitoring the operation of the coating device, for example sensors arranged in the area of the pressing-on region and detecting the temperature of the applied coating material 12, for example. Based upon this information, the controller may not only control the energy source 30 but also the focussing device 32, as need be.

In the present embodiment, the first joining device or energy source 30 is supported by means of a linear guide 34 in such manner that the first joining means 30 is movable between a joining position shown in FIG. 1 and a rest position shown in FIG. 2. This movement of the first joining means 30 may, for example, be performed manually or possibly also by means of a drive (not shown).

Moreover, in the present embodiment, the coating device 1 comprises a second joining means 40 shown schematically in FIG. 2, and which serves also for applying and/or activating an adhesive agent on a coating material 12 fed by the feed means 10 and/or on a surface 2a to be coated of a workpiece 2. In the present embodiment, the second joining means 40 is constructed according to classical bonding (gluing) technology and comprises a glue reservoir 44 in which hot-melt adhesive granules, for example, are stored, wherein the hot-melt adhesive granules can be brought to the desired melting temperature by means of a heating device not shown in detail. Moreover, in the present embodiment, the second joining means 40 comprises a glue applicator roll 42 by means of which the molten glue is applied onto the coating material 12 or the surface 2a of the workpiece.

In the present embodiment, the second joining device 40 is inserted in a collet 46 of the device 1 in such manner that it may be removed again according to need—possibly also manually. In order to securely hold the second joining means 40 within the collet 46, a quick-action coupling or the like may be provided therein.

In the present embodiment, the operation of the coating device 1 according to the invention takes place as follows. Initially, the first joining device 30 is situated in the joining position shown in FIG. 1. In this position, the joining means 30 may apply energy onto the fed coating material 12 or the surface 2a to be coated of the workpiece 2, in order to activate an adhesive agent present thereon.

Subsequently, the coating material 12 is pressed onto the surface 2a to be coated of the workpiece by means of the pressing roller 20 so that the coating material 12 is fixedly joined with the workpiece 2. As soon as a further coating material 12 not provided with an adhesive agent has to be processed, for example, or maintenance or repair operations are necessary at the first joining means 30, the first joining means 30 is displaced or driven from the joining position into a rest position shown in FIG. 2. Now, the second joining means 40 is inserted into the collet 46 of the coating device 1 and is situated in its joining position there. Now, the supplied coating material 12 or the surface 2a to be coated of the workpiece 2 is provided with adhesive agent by means of the second joining means 40, and the coating material 12 is fixedly applied onto the surface 2a to be coated of the workpiece 2 by means of the pressing roll 20.

After finishing the necessary processing by using the second joining means 40, the latter may be removed from the collet 46 so as to displace the first joining device 30 from its rest position into the joining position shown in FIG. 1. A new coating operation may now be performed by using the first joining means 30.

A second preferred embodiment of an inventive device 1 for the coating of workpieces 2 is described in the following by reference to FIG. 3 which shows a schematic top view of a device 1 for the coating of workpieces 2. The device 1 shown in FIG. 3 is, by means of example, configured as processing center having a clamping table 90 that is stationary or, possibly, displaceable within limits and onto which the workpieces 2 can be clamped. The clamping table may, for example, be also configured as a rotating table.

A cantilever arm or portal 70 extends above the clamping table and is displaceable along the clamping table 90 perpendicularly to its direction of extension. Here, it is to be observed that a device according to the invention may also have several cantilever arms and/or portals that are each provided with one or more appropriate means. In particular in displaceable clamping tables it is further possible that at least one guide means is arranged stationary.

A first joining means 50 is provided via a cross slide 92 at the guide means 70, at which in turn a combined feeding means 10 and pressing means 20 are arranged. The first joining means 50 may, for example, be chosen according to the first joining means described above.

At the opposite side (or possibly the same side) of the guide means 70 a mandrel unit 80 is provided via a further cross slide 92, into which unit processing tools and processing aggregates may be substituted via an interface having a positive taper lock adapter (collet). The interface may for example be a universal interface such as the one disclosed in patent application. EP 0 743 139 of the applicant.

In the conditions shown in FIG. 3, a second joining means 60 is substituted into this interface, which joining means are, for example, a gluing aggregate operating with hot-melt adhesive. Here, the gluing aggregate 60 comprises a connecting portion which can be inserted into the positive taper lock adapter of the mandrel unit 80.

At the right outer end of the guide means 70 a repository 94 for processing tools and processing aggregates is provided, which is configured so as to automatically provide the mandrel unit 80 with processing tools and processing aggregates, including the second joining means 60. Here, it is equally possible that several guide means 60 are stored in the repository 94 which are substituted into the mandrel unit 80 according to need.

In this manner, the processing center shown in FIG. 3 allows for a complete or at least far-reaching processing and finishing of workpieces 2, wherein different coating technologies may be employed as needed.

As third preferred embodiment of the invention, an alternative configuration of the processing center 1 shown in FIG. 3 is illustrated in a schematic top view of FIG. 4. The embodiment shown in FIG. 4 is distinguished in that the first joining means 50 is operatively coupled with the spindle unit 80 or its cross-slide 92 so that both units may be displaced together. Also in this case, the second joining unit 60 may possibly be arranged at the opposite side of the guide means 70 and still be coupled through an appropriate connection with the mandrel unit 80.

Also in the second embodiment shown in FIG. 4, a wide variety of tools and processing aggregates (including joining devices) may advantageously be stored in the repository 94 and substituted into the collet or interface of the mandrel unit 80 according to need. A processing center according to the invention or a similar device according to the invention thus do not necessarily have to comprise a fixedly installed joining means but may possibly comprise also several joining means stored in a repository or the like, which may be alternately or concurrently substituted into one or more mandrel units.

The invention claimed is:

1. A device for the coating of a workpiece comprising:
   a feeding device comprising a reservoir of multiple, different coating materials,
   a pressing device for pressing the coating materials onto a surface of the workpiece,
   a conveyor causing relative movement between the pressing device and the workpiece,
   a first joining device for activating a first adhesive agent on a first coating material fed by the feeding device,
   a second joining device for applying and activating a second adhesive agent on the surface of the workpiece,
   wherein at least one of the joining devices comprises an energy source selected from the group consisting of a laser source, an infrared source, an ultrasound source, a magnetic field source, a microwave source, a plasma source, and a gassing source, and
   a controller configured to choose between (1) activation of the adhesive agent on the first coating material by the first joining device and (2) application and activation of the second adhesive agent on the surface by the second joining device.

2. The device according to claim 1, characterized in that at least one joining device is arranged stationary.

3. The device according to claim 1,
characterized in that
at least one joining device is movable between a joining position and a rest position.

4. The device according to claim 3, further comprising at least one drive to move the at least one joining device between the joining position and the rest position.

5. The device according to claim 1, characterized in that at least one joining device is releasably insertable into a collet in a joining position of the device by a quick-action coupling.

6. The device according to claim 1, characterized in that at least one joining device comprises a bar-shaped guide device that is displaceable perpendicularly to its direction of extension, wherein the at least one joining device is displaceable along the guide device.

7. The device according to claim 6, further comprising at least a mandrel unit having a collet for automatically substituting processing tools and/or processing aggregates.

8. The device according to claim 7, characterized in that the at least one joining device is substitutable into the collet of the mandrel unit which has a positive taper lock adapter.

9. The device according to claim 7, characterized in that the at least one joining device is associated with the mandrel unit in order to be displaceable together.

10. The device according to claim 1, characterized in that at least one joining device is associated with the pressing device for pressing the coating material onto the surface of the workpiece and the feed device for feeding the coating material.

\* \* \* \* \*